June 6, 1939. W. C. SAUNDERS, JR 2,161,094
FISH LURE
Original Filed July 13, 1937
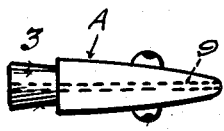
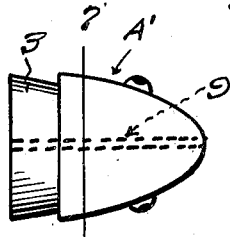
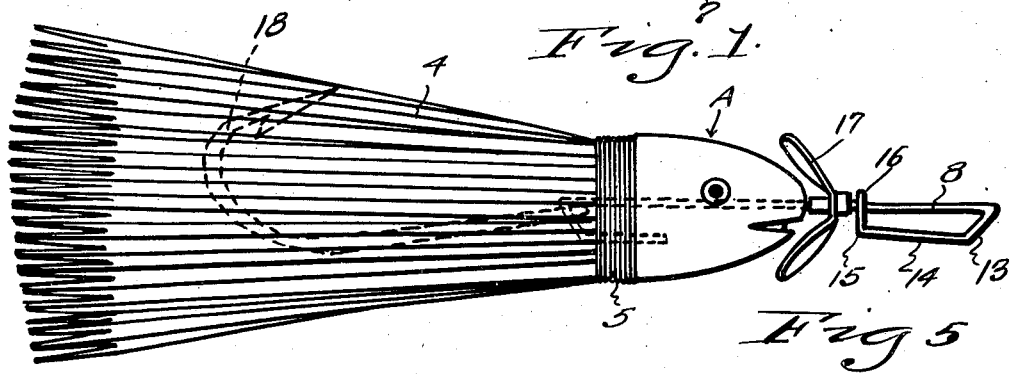
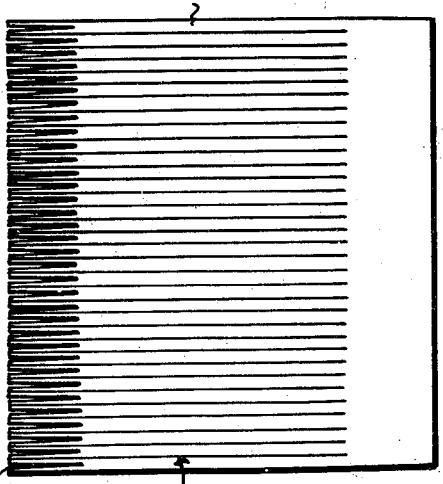
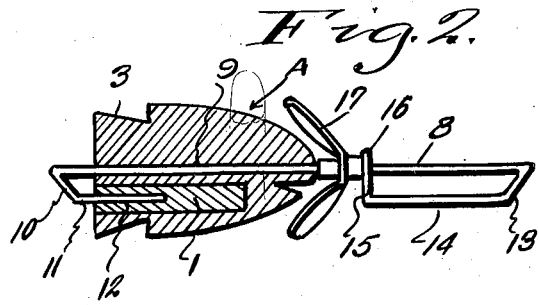
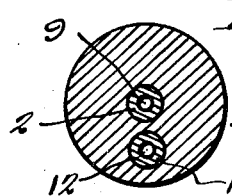
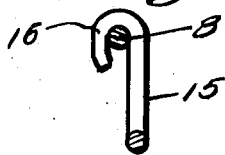
Inventor
W. C. Saunders, Jr.
By Clarence A. O'Brien
Hyman Berman
Attorneys Patented June 6, 1939

2,161,094

UNITED STATES PATENT OFFICE 2,161,094

FISH LURE

Walter Conway Saunders, Jr., Richmond, Va.

Application July 13, 1937, Serial No. 153,436
Renewed April 7, 1939

1 Claim. (Cl. 43—42)

This invention relates to an artificial fish lure of the streamer type, the general object of the invention is to so form the lure that it will simulate in its motions or actions minnows and the like upon which game fish feed.

Another object of the invention is to provide means whereby the fish hooks may be readily put in place or removed or reversed without the use of tools and yet the attachment will be strong enough to hold the heaviest fish.

A further object of the invention is to so form the lure that it will not catch or snag in grass, weeds or other obstructions and which does not use any guards or the like over the point of the hook which have a tendency to prevent the fish from becoming hooked.

Another object of the invention is to so form the device as to reduce the drag or pull when trolled to a minimum so that fishing with this lure is less tiring to the angler than most lures now on the market and it also enables the angler to receive the maximum amount of thrill from the strike.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is an elevation of the invention.

Figure 2 is a longitudinal vertical sectional view through the body thereof.

Figure 3 is a top plan view of the body.

Figure 4 is a sectional view through the front part of the rod to show how the hook at one end of the rod snaps over another part of the rod.

Figure 5 is a view of the slitted sheet which forms the tail of the lure.

Figure 6 is a plan view of a modified form of body.

Figure 7 is a section on the line 7—7 of Figure 6.

In these figures the letter A indicates the body of the device which is preferably made to simulate the head of a fish and in Figures 1, 2 and 3 the body is of narrow width and tapering from its front end to its rear end while in Figures 6 and 7 the body is made wider and is of substantially circular shape in cross section but also tapers from its front end to its rear end. In the first form of the invention a plug 1 of lead or the like is placed in the body to keep it in an upright position, while in the second form of the invention as shown in Figures 6 and 7 a second plug 2 is placed in the body. It is to be understood, however, as many of these weighted parts may be used as is necessary or other means may be used to keep the body in an upright horizontal position. In both forms of the invention the rear end of the body is formed with a rearwardly flaring part 3 the front end of which is of less cross sectional area than the rear end of the body so as to leave a shoulder at this point. A sheet of rubber or the like, shown at 4 in Figures 1 and 5, has its front end folded around the part 3 and suitably connected with said part by a wrapping as shown at 5 or by any other suitable means. The sheet is formed with the slits 6 and the parts between these slits are formed with slits 7 at their rear ends as shown. This sheet may be formed of rubber, cloth or any other suitable material and the tapered part 3 serves two purposes, in that it prevents the tail or skirt from pulling off and it also causes the tail or skirt to flare out in a more life-like manner.

A rod or wire 8 passes slidingly through a longitudinally extending bore 9 formed in the body and, as shown in Figure 7, this bore may extend through the top plug 2 when such plug is used. The rear end of the rod or wire is first bent forwardly and outwardly at an angle to provide the part 10 and then it is bent again to provide the forwardly extending part 11 which parallels the main part of the rod or wire and this part is adapted to engage a hole 12 in the lower plug 1. The front end of the rod at quite a distance from the front end of the body, is first bent to provide the rearwardly and outwardly extending part 13, then bent again to provide the rearwardly extending part 14 which parallels and is spaced from the major portion of the front part of the rod and then the rear end of this part 14 is bent at right angles toward said major part as at 15 and the extremity of this part 15 is bent into hook-shape as shown at 16 which is adapted to snap over the said major front part of the rod.

A spinner 17 is rotatably supported on the rod with its hub between the part 15 and the front end of the body and a hook 18 is adapted to have its eye placed on the part 10 at the rear portion of the rod or wire. To put a hook such as 18 in place or to reverse it or to remove it the hook 16 is pushed from over the major part of the front portion of the rod and the parts separated so that the spinner can be pushed past the part 15 and then the rod is pushed rearwardly so as to push the part 11 from the hole in the plug 1 so as to free the end of this part 11 to permit the eye of the hook to be placed over the same onto the part 10 or to permit the hook to be removed or reversed. Then the rod 9 is slid forwardly so that the part 11 will engage the hole 12, after which the spinner is moved back to its original position and then the hook 16 is snapped over the major part of the rod so that the parts will assume the position shown in Figures 1 and 2. This arrangement permits the hook to be changed or reversed without the use of tools and by forming the parts 10 and 13 as shown the hook and the point of attachment of the line to the front end of the rod will be in a substantially straight line which increases the strength of the parts and enables large fish to be caught.

By making the hook 16 as shown in Figure 4 a snap action is produced between the hook and that part of the wire which it engages so that there is no danger of the parts becoming separated accidentally.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed as new is:

A fish lure of the class described comprising a head, a rod passing longitudinally therethrough and having its rear end first bent to provide an outwardly and forwardly extending part and then bent to provide a forwardly extending straight part, the rear end of the body having a hole therein, a weight in the hole having a hole therein for receiving said straight part when the rod is in its forward position and said straight part leaving the hole in the weight when the rod is in its rearward position whereby the eye of a fish hook can be placed over the straight part to engage the first bent part, the front end of the rod being first bent to provide a rearwardly and outwardly extending part for receiving a line, then a rearwardly extending part which is bent at right angles and then bent into hook shape to engage a portion of the front part of the rod in a detachable manner and a spinner having its hub rotatably arranged on that part of the rod between the hook-shaped portion and the front end of the body the outwardly and forwardly extending part at the rear of the rod and the rearwardly and outwardly extending part at the front of the rod acting to hold the line and the eye of the fish hook in alignment.

WALTER CONWAY SAUNDERS, Jr.